United States Patent [19]
Roberto

[11] Patent Number: 5,335,786
[45] Date of Patent: Aug. 9, 1994

[54] METHOD AND APPARATUS FOR SEPARATION AND RECYCLING PLASTICS

[76] Inventor: Ronald N. Roberto, P.O. Box 292, Boxford, Mass. 01921

[21] Appl. No.: 113,605

[22] Filed: Aug. 27, 1993

[51] Int. Cl.⁵ .................................................. B03B 1/00
[52] U.S. Cl. ........................................ 209/3; 209/10; 209/636; 209/33
[58] Field of Search ............... 209/3, 10, 38, 40, 33, 209/11, 636, 223.1

[56] References Cited

U.S. PATENT DOCUMENTS

| | | | |
|---|---|---|---|
| 3,970,546 | 7/1976 | Webb et al. | 209/3 |
| 4,073,661 | 2/1978 | Buzga et al. | 209/3 X |
| 4,353,725 | 10/1982 | Hohman et al. | 209/11 X |
| 4,379,748 | 4/1983 | Hoogendoorn | 209/11 |
| 4,578,184 | 3/1986 | Rasmussen | 209/3 |
| 4,830,188 | 5/1989 | Hannigan et al. | |
| 4,844,351 | 7/1989 | Holloway | 209/11 X |
| 5,060,870 | 10/1991 | Trezek et al. | |
| 5,061,735 | 10/1991 | Zielinski | 209/11 X |
| 5,084,135 | 1/1992 | Brooks et al. | 209/3 X |
| 5,110,055 | 5/1992 | Teeny | 209/3 X |
| 5,115,987 | 5/1992 | Mithal | |
| 5,133,249 | 7/1992 | Zittel | |
| 5,183,212 | 2/1993 | Boo et al. | 209/3 X |
| 5,246,115 | 9/1993 | Vezzoli et al. | 209/3 X |
| 5,246,116 | 9/1993 | Kirk | 209/3 |
| 5,248,041 | 9/1993 | Deiringer et al. | 209/11 X |

*Primary Examiner*—D. Glenn Dayoan
*Attorney, Agent, or Firm*—Edward A. Gordon

[57] ABSTRACT

The invention comprises a method and apparatus for separating and recycling plastics from plastic parts containing, for example, light metal, rubber, non-ferrous metals and labels of any type attached. The plastic parts are also reduced to selected sizes. The method and apparatus basically includes shredding the plastic parts so as to reduce the plastic parts into a first reduced size of plastic pieces; moving the shredded plastic pieces to subject them to a magnetic device so that light metal material is removed from the shredded plastic pieces; subjecting the plastic pieces to a grinder device to reduce the plastic pieces to smaller pieces; subjecting the smaller plastic pieces to a sufficient high pressure steam to remove contaminate materials from the plastic pieces; and drying the plastic pieces and contaminate materials and separating the plastic pieces from the contaminate materials.

19 Claims, 4 Drawing Sheets

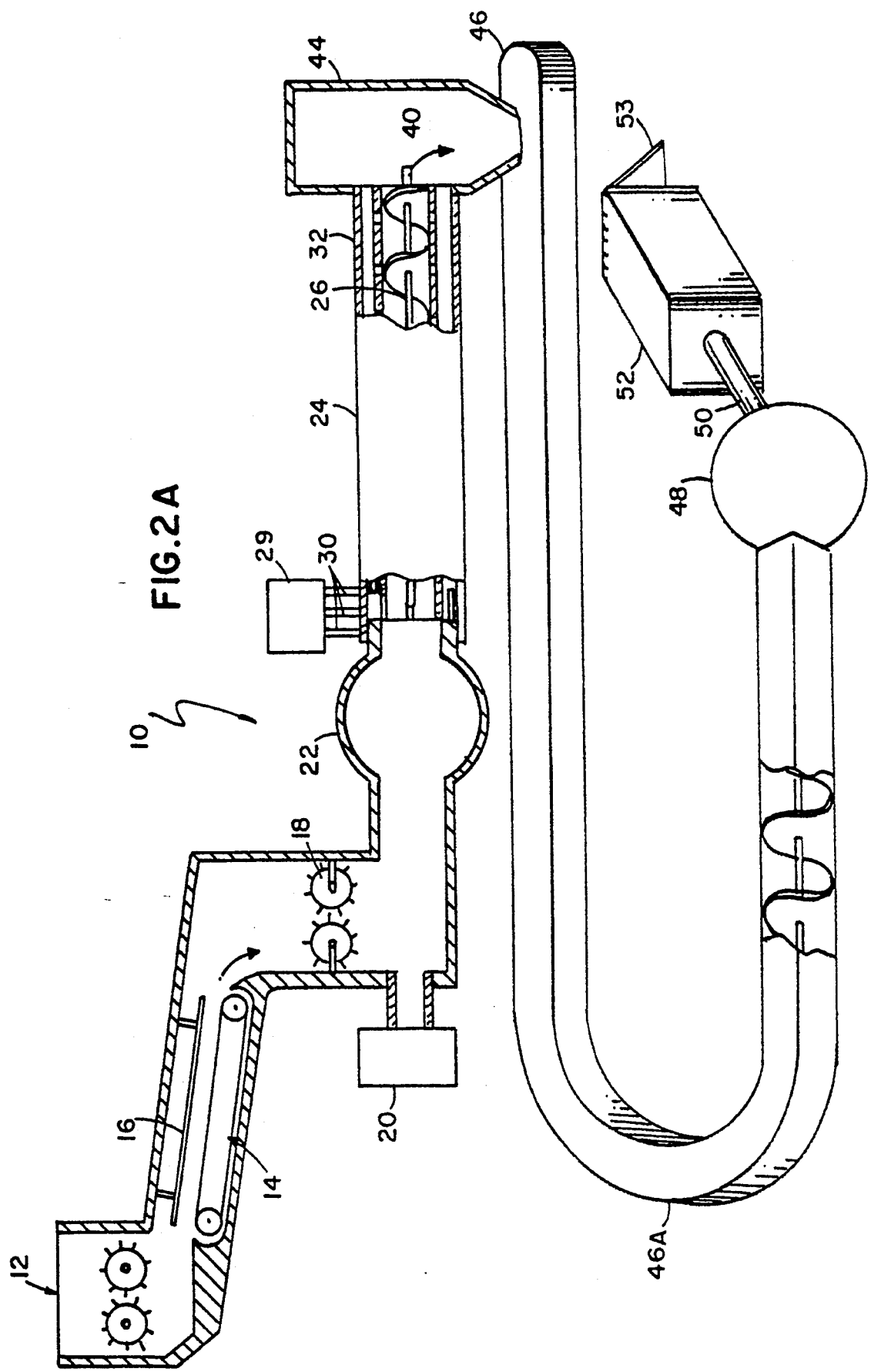

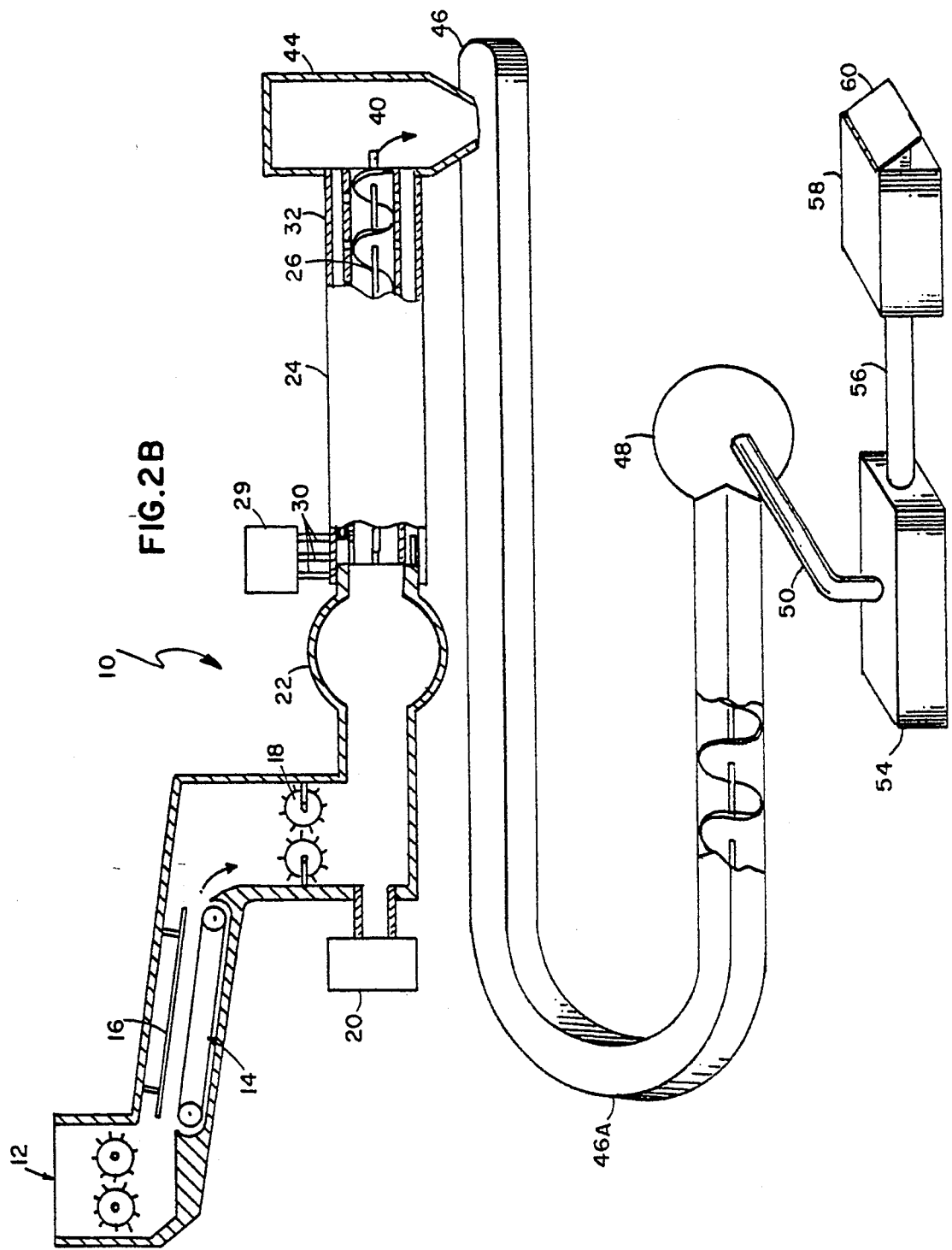

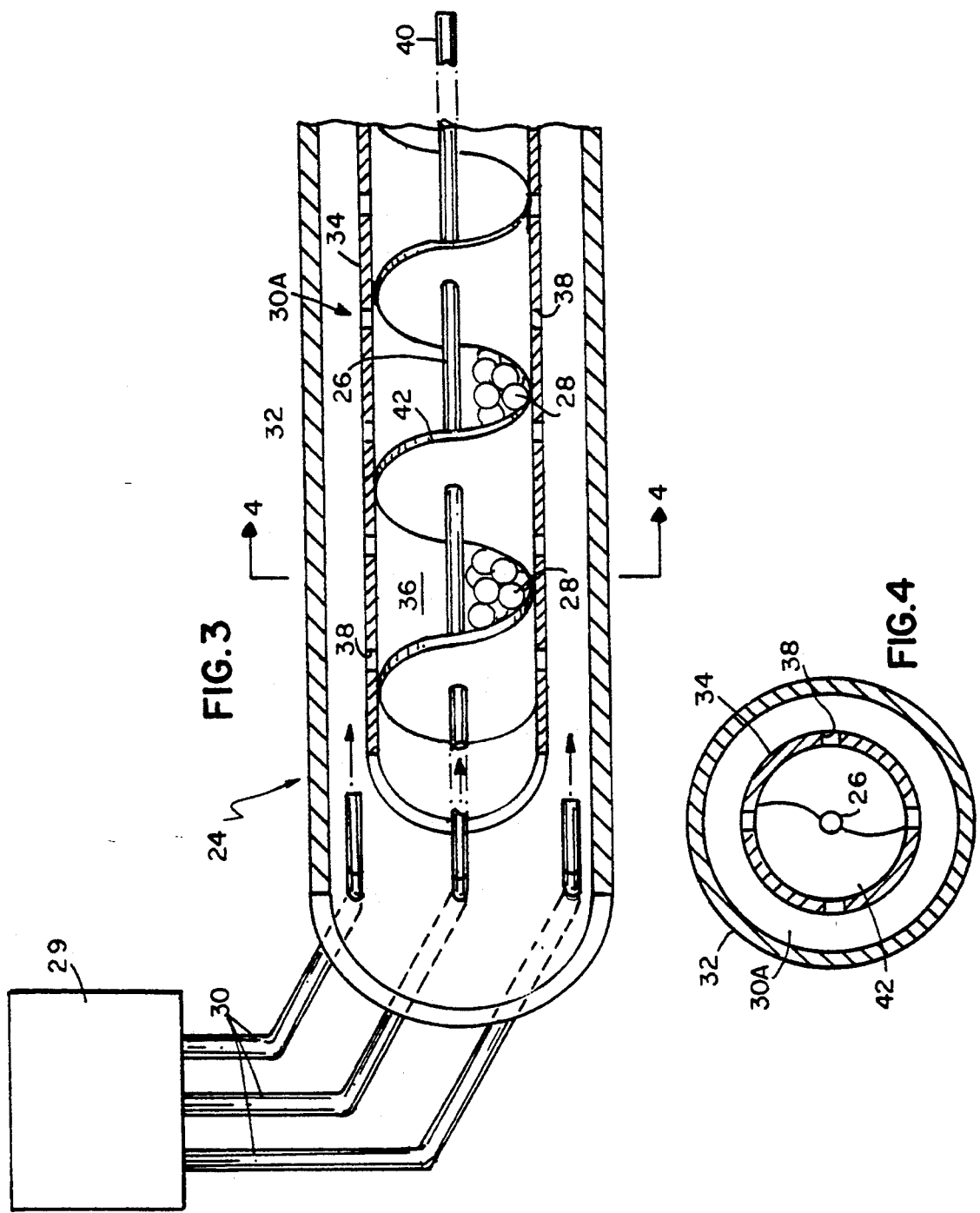

METHOD AND APPARATUS FOR SEPARATION AND RECYCLING PLASTICS

BACKGROUND OF THE INVENTION

1. Field of the Invention

The present invention relates generally to plastic recycling and more particularly to a new and improved method and apparatus for separating and recycling plastic from plastic parts.

2. Description of Prior Art

Plastic is the most common material being used for industrial products. It is used in a wide variety of products, for example, for its light-in-weight property and durability. As a result, plastic waste is large in amount and causes a serious problem of environmental protection. In order to reduce the cost of material and mitigate environmental pollution, it is desirable that the plastic waste can be recycled.

U.S. Pat. No. 5,137,042 discloses a preparatory machine for recycling having a first washing device, a second washing device, a drying device, and a collecting device. Pieces of material are washed with detergent-added water in the first cleaning device. Pieces of material then transported to the second washing device by a conveyor screw. The pieces of material are then washed with water in the second washing device. The pieces of material are then dried in the drying device. The dried pieces of material are then collected with the collecting device.

U.S. Pat. No. 5,060,870 discloses a method and apparatus for recycling foamed polystyrene from municipal solid waste and more particularly, from fast food restaurant waste. A steady stream of waste is delivered to a flail mill for reducing particle size, a rotary trammel for eliminating undersized waste and a rotary air classifier for removing "heavy" waste from the stream. At this point, the waste stream comprises mostly paper and foamed polystyrene. The paper and foamed polystyrene are delivered to a water pulper which fiberizes the paper so that it can then be separated from the foamed polystyrene by passing it through a screen of selected mesh size to allow the water and paper pulp to pass through while retaining the foamed polystyrene.

U.S. Pat. No. 4,830,188 discloses plastics fragments including polyethylene terephthalate and polyolefins derived from comminution of containers such as beverage bottles are segregated according to specific gravity by flotation. The flotation liquid includes a surfactant to facilitate complete separation of the light and heavy plastic fractions from one another. The surfactant may be a residue of a detergent used to wash the flakes and remove contaminants therefrom. Rinsing prior to flotation separation is controlled so as to leave the desired detergent residue leading to a marked reduction in rinse water requirements.

The following U.S. Patents are also believed to exemplify the present state of the art with respect to plastic separation and recycling methods and apparatus: U.S. Pat. Nos. 2,911,730; 3,811,148; 4,106,705; 4,719,933; 4,844,351; 5,115,987; and 5,133,249.

While such prior art devices provide improvement in the areas intended, there still exists a need for a new and improved method and apparatus for separating and recycling plastics which overcomes the disadvantages of the prior art while providing utility features which provide new and useful advantages and improvements not heretofore disclosed.

Accordingly a principle desirable object of the present invention is to provide a new and improved method and apparatus for separating and recycling plastics which overcomes some or all of the disadvantages of the prior art devices.

Another desirable object of the present invention is to provide an apparatus capable of crushing the plastic parts into selected size pieces.

Another desirable object of the present invention is to provide an apparatus which has a grinding system for reducing the plastic parts to small pellets.

Another desirable object of the present invention is to provide an apparatus which has an aspiration system for removing small fines and loose labels that are mixed with the plastic pellets.

Another desirable object of the present invention is to provide an apparatus for recycling the plastic pellets which has a cleaning device for cleaning the plastic pellets.

Another desirable object of the present invention is to provide an apparatus for recycling the plastic pellets which has a drying device for drying the plastic pellets.

These and other desirable objects of the invention will in part appear hereinafter and will in part become apparent after consideration of the specification with reference to the accompanying drawings and the claims.

SUMMARY OF THE INVENTION

The present invention comprises a method and apparatus for separating and recycling plastics from plastic parts containing for example light metal, rubber, non-ferrous metals and labels of any type attached. Plastic parts are fed to a grinder which chops the plastic parts into small nuggets. A blower removes the plastic material from the grinder into an aspirator which then removes any fines (tiny pieces of plastic) and loose labels from the grinding device. The plastic material is then moved directly into a steam tube device. The steam tube device includes an outer cover, an inner manifold pipe cover with small holes drilled about the inner manifold pipe cover and a hollow core auger within the inner pipe cover. A small high pressure boiler device supplies steam which is introduced into the inner manifold pipe cover. The holes of the inner pipe cover receive steam which heats the inside of the inner manifold pipe tube to a high temperature such as 150–300 degrees fahrenheit. The ground plastic enters the front of the inner tube and is transferred through the inner tube by means of the auger. The pieces of the plastic are heated to a point whereby any labels attached to the plastic pellets fall off as unable to stay adhered to the plastic pellets. Since different plastics have various melting temperatures, such as low and high melting temperatures, the process is controlled not by controlling the temperature, but by varying the speed of the auger to advance the plastic material through the inner tube fast enough so as to not melt the plastic material but just slow enough to heat the plastic material to remove the labels. The plastic material exits the auger of the inner tube and goes to a screener which removes any large pieces of plastic, excess water, and more fines. From the screener the hot plastic material is blown through another long drying tube device, such as for example 60–80 feet long, and by the air friction the plastic material is dried. The plastic material then drops from the long drying tube device into another aspirator which is arranged to remove any loosen labels for the final treatment. The plastic material is then transferred from the final aspirator to a destoner machine which separates the plastic material from any metal. As an alternate embodiment the plastic material is transferred to a flotation tank which by specific gravity will float the plastic material wanted and sink the bad material. The desired plastic material continues to go directly from the flotation tank into a spin dryer to dry the plastic material as finished.

BRIEF DESCRIPTION OF THE DRAWINGS

For a fuller understanding of the nature and desired objects of the invention, reference should be had to the following detailed description taken in connection with the accompanying drawings wherein like reference characters denote corresponding parts throughout the several views and wherein:

FIG. 2A is a fragmentary perspective view illustrating the methods and apparatus embodying the principles of the present invention with an embodiment of a destoner machine device;

FIG. 2B is a fragmentary perspective view illustrating the methods and apparatus embodying the principles of the present invention with an alternate embodiment containing a floating tank device and a spin dryer device;

FIG. 3 is an enlarged partial cross-section view of the steam tube device for treating the plastic pellet devices; and FIG. 4 is a cross-sectional view taken along the line 4—4 of FIG. 3.

DETAILED DESCRIPTION OF PREFERRED EMBODIMENTS

Figure 1:
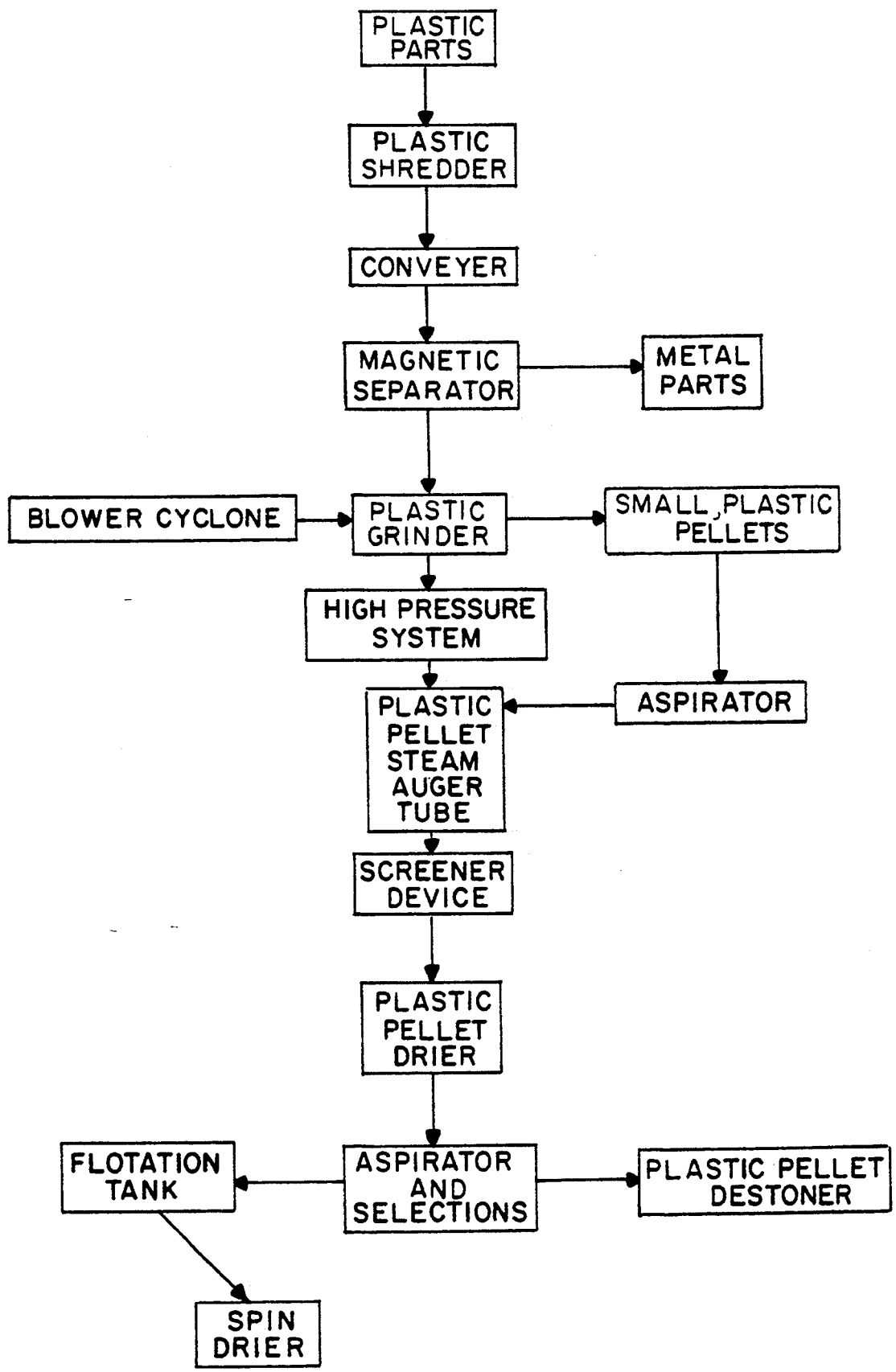
FIG. 1 is a process flow schematic showing an example of the method and apparatus for separating and recycling plastic from plastic parts.

Referring now to the drawings, there is illustrated the apparatus for separating and recycling plastic parts. As illustrated, the apparatus indicated generally by the numeral 10 comprises an initial shredder means 12 which crushes the plastic parts into pieces such as approximately 2×2 inch pieces. A conveyer belt 14 is provided to move the plastic parts into the grinder device 18. A magnetic device 16 is positioned above and adjacent to the conveyer belt 14. In this arrangement the magnetic device 16 removes any light metal parts (ferrous metal) from the plastic parts as they move along the conveyer belt 14 and is fed into a plastic grinder device 18. The grinder device 18 reduces the plastic parts to small pellets preferably to approximately ⅜ of an inch. A blower cyclone system device 20 is attached to the bottom of the grinder device 18 to transform the plastic pellets to an aspirator device 22. The aspirator device 22 removes material such as small fines and loose labels that are mixed with the small plastic pellet devices 28.

The aspirated small plastic pellet devices 28 are then dropped into the steam auger tube device 24. The steam auger tube device 24, hereinafter sometimes also referred to as cylindrical device 24, which includes an inner auger system 26 to convey the plastic pellet device 28, is provided with a high pressure steam device 29 containing three conductor devices 30 to conduct steam into the circular space 30A between the outer cover 32 and the inner cover 34 of the steam tube device 24. In this manner the steam blows into the space 30A of the tubular device member 24 through the holes 38 of the inner cover 34 of the tubular device 24 and heats the inside of the inner manifold pipe tube center 36 to a high temperature such as 150–300 degrees fahrenheit. The steam also flows through the auger tube section 26 of the screw conveyer 42 and out of auger tube end section 40. The plastic pellets 28 and any remaining contaminates exit the steam auger tube device 24 at the adjacent end section 40 into a vibrating screener device 44 which removes excess water and then conveys the plastic pellets 28 into a blower conveying device 46 containing tube unit 46A which dries the plastic pellet material 28. An aspirator unit 48 is attached to the end of the tubular unit 46 and receives the plastic pellets 28 and removes any remaining loosened contaminate material from the plastic pellets 28.

From the aspirator 48 as illustrated in FIG. 2A, the plastic pellet material 28 is conveyed through the tube member 50 to a destoner machine device 52. The destoner machine device 52 separates the non-ferrous metals from the plastic pellets 28 so that the plastic pellets 28 are now clean and free of any foreign material. The destoner device includes a discharge hatch 53.

In an alternate embodiment as illustrated in FIG. 2B, if the plastic pellets 28 are contaminated with another type of plastic, the apparatus 10 of the present invention provides means for separating the two plastic materials as described as an alternate embodiment. As an alternate embodiment the plastic material is transferred to the floating tank 54 which with water set to a specific gravity will float the plastic material wanted and sink the bad material. The desired plastic material continues to go directly from the flotation tank 54 through the tube member 56 into the spin dryer device 58 to dry plastic material as finished. The spin dryer device 58 has a discharge hatch 60.

While the invention has been described with respect to preferred embodiments, it will be apparent to those skilled in the art that changes and modifications may be made without departing from the scope of the invention herein involved in its broader aspect. Accordingly, it is intended that all matters contained in the above description, or shown in the accompanying drawings shall be interpreted as illustrative and not in a limiting sense.

What is claimed is:

1. A method of separating contaminates from plastic parts and recycling the plastic parts to provide plastic pieces free of all material comprising the steps of:
   reducing said plastic parts to a first reduced size of plastic pieces;
   removing the metal materials from the first reduced size of plastic pieces;
   subjecting the first reduced size of plastic pieces to a grinder device to reduce the plastic pieces to smaller pieces;
   subjecting the smaller plastic pieces to a sufficient high pressure steam to remove contaminate materials from the smaller plastic pieces; and
   drying the plastic pieces and contaminate materials and separating the plastic pieces from the contaminate materials.

2. The method according to claim 1 wherein said plastic parts are first passed through a shredder device to reduce the plastic parts.

3. The method according to claim 2 wherein the plastic parts are shredded into parts of approximately 2×2 inches.

4. The method according to claim 3 further comprising moving the shredded plastic parts through a magnetic device to remove any light metal material from the plastic parts.

5. The method according to claim 1 further comprising the step of moving the plastic parts through a tubular device and applying high pressure steam auger to the plastic parts within which the plastic parts get hot enough to cause whatever adhesive is used on a label attaching to plastic parts to remove the labels from the plastic parts.

6. The method according to claim 5 wherein the high pressure steam auger is maintained at a temperature range between about 225 and about 300 degrees fahrenheit.

7. The method according to claim 5 further comprising a step subsequent to said high pressure steam auger treatment whereby non-ferrous metals are separated from the plastic parts.

8. The method according to claim 5 further comprising the steps subsequent to said high pressure steam auger treatment whereby the plastic parts are transferred to a flotation tank with water set to a specific gravity to sink the bad materials and to float the plastic material to a spin dryer to be dried.

9. A method of separating contaminates from plastic parts and recycling the plastic parts to provide plastic pellets free of all material comprising the steps of:
    shredding said plastic parts so as to reduce the plastic parts into a first reduced size of plastic pieces;
    moving the shredded plastic pieces to subject them to a magnetic device so that light metal material is removed from the shredded plastic pieces;
    subjecting the plastic pieces to a grinder device to reduce the plastic pieces to smaller pieces;
    subjecting the smaller plastic pieces to a sufficient high pressure steam to remove contaminate materials from the plastic pieces; and
    drying the plastic pieces and contaminate materials and separating the plastic pieces from the contaminate materials.

10. A method of separating contaminates from plastic parts and recycling the plastic parts to provide plastic pellets free of all material comprising the steps of:
    shredding said plastic parts so as to reduce the plastic parts into a first reduced size of approximately 2×2 inches;
    moving the shredded plastic pieces to subject them to a magnetic device so that light metal material is removed from the shredded plastic pieces;
    subjecting the plastic pieces to a grinder device to reduce the plastic pieces to small pellets of a size of approximately ⅜ of an inch;
    moving the plastic pellets through a tubular device and applying high pressure steam auger to the plastic pellets within which the plastic pellets get hot enough to cause whatever adhesive is used on a label attaching to plastic pellets to remove the labels from the plastic pellets; and
    drying the plastic pieces and contaminate materials and separating the plastic pieces from the contaminate materials.

11. An apparatus for separating and recycling plastic from plastic parts containing various contaminate materials, said apparatus comprising:
    means for reducing the plastic parts to a first predetermined size of plastic pieces;
    means for removing light metal particles from the first reduced size of the plastic parts;
    means for further reducing the plastic pieces to small pellets;
    means for removing small fines and lose labels that are mixed with the plastic pellets;
    means for treating said plastic pellets with high temperature pressure steam to remove labels;
    means for removing water and drying the plastic pellets and remaining contaminates; and
    means for separating the plastic pellets from the remaining contaminates.

12. The apparatus in accordance with claim 11 wherein said means for first reducing the plastic parts comprises a shredder means for receiving the plastic parts and crushing them into smaller pieces.

13. The apparatus in accordance with claim 11 wherein said means for removing metal parts comprises magnetic means contacting said metal parts.

14. The apparatus in accordance with claim 11 wherein said means for further reducing the plastic pieces comprises a grinder means for reducing the plastic pieces to small pellets.

15. The apparatus in accordance with claim 11 wherein said means for removing labels comprises an aspirator device.

16. The apparatus in accordance with claim 11 wherein the means to remove labels comprises:
    a steam auger tube device having an outer cover device extending from an aspirator device to a screener device;
    said steam auger tube device positioned within an inner cover extending within the outer cover device and containing holes whereby steam will flow between the outer and inner covers and pass through the holes;
    a screw conveyor means positioned within said inner cover member whereby plastic pellets are conveyed through the steam auger tube device;
    a material drying tube device positioned within a blower conveying device extending from the screener device to an aspirator device; and
    a high pressure steam device attached to said steam auger tube device adjacent the aspirator device so as to conduct steam through the steam auger tube device and remove labels from plastic pellets.

17. An apparatus for separating and recycling plastic from plastic parts containing various contaminate materials, said apparatus comprising:
    shredder means for receiving the plastic parts and crushing them into first reduced pieces;
    magnetic means for removing light metal particles from the first reduced size of the plastic parts;
    grinder means for further reducing the plastic pieces to small pellets;
    means for removing labels comprising a steam auger tube device having an outer cover device extending from an aspirator device to a screener device; said steam auger tube device positioned within an inner cover extending within the outer cover device and containing holes whereby steam will flow between the outer and inner covers and pass through the holes; a screw conveyer means positioned within said inner cover member whereby plastic pellets are conveyed through the steam auger tube device; a material drying tube device positioned within a blower conveying device extending from the screener device to an aspirator device; and a high pressure steam device attached to said steam auger tube device adjacent the aspirator device so as to conduct steam through the steam auger tube device and remove labels from plastic pellets;

means for removing water and drying the plastic pellets and remaining contaminates; and means for separating the plastic pellets from the remaining contaminates.

18. The apparatus as set forth in claim 17 further comprising means for separating non-ferrous metals from plastic pieces.

19. The apparatus as set forth in claim 17 further comprising a floating tank means having a selected gravity whereby only the type of selected plastic material will float to a dryer device.

* * * * *